US012524959B2

(12) United States Patent
Wang et al.

(10) Patent No.: US 12,524,959 B2
(45) Date of Patent: Jan. 13, 2026

(54) LEARNING A 3D SCENE GENERATION MODEL FROM IMAGES OF A SELF-SIMILAR SCENE

(71) Applicants: Adobe Inc., San Jose, CA (US); UCL Business Ltd., London (GB)

(72) Inventors: Oliver Wang, Seattle, WA (US); Animesh Karnewar, London (GB); Tobias Ritschel, London (GB); Niloy Mitra, London (GB)

(73) Assignees: Adobe Inc., San Jose, CA (US); UCL Business Ltd., London (GB)

( * ) Notice: Subject to any disclaimer, the term of this patent is extended or adjusted under 35 U.S.C. 154(b) by 220 days.

(21) Appl. No.: 18/233,458

(22) Filed: Aug. 14, 2023

(65) Prior Publication Data

US 2025/0061647 A1    Feb. 20, 2025

(51) Int. Cl.
*G06T 17/00*    (2006.01)
*G06N 3/0464*    (2023.01)
*G06N 3/08*    (2023.01)
*G06N 3/094*    (2023.01)
*G06T 15/20*    (2011.01)

(52) U.S. Cl.
CPC ............ *G06T 17/00* (2013.01); *G06N 3/0464* (2023.01); *G06N 3/08* (2013.01); *G06N 3/094* (2023.01); *G06T 15/20* (2013.01); *G06T 2200/24* (2013.01)

(58) Field of Classification Search
CPC ...................................................... G06N 3/088
See application file for complete search history.

(56) References Cited

PUBLICATIONS

Zhang, Zaiwei, et al. "Deep generative modeling for scene synthesis via hybrid representations." ACM Transactions on Graphics (TOG) 39.2 (2020): 1-21. (Year: 2020).*
Son, Minjung, et al. "Singraf: Learning a 3d generative radiance field for a single scene." Proceedings of the IEEE/CVF conference on computer vision and pattern recognition. 2023. (Year: 2023).*
Abdal et al., Styleflow: Attribute-Conditioned Exploration of StyleGAN-Generated Images Using Conditional Continuous Normalizing Flows, ACM Transactions on Graphics, vol. 40, No. 3, Available Online at: https://arxiv.org/pdf/2008.02401.pdf, Sep. 20, 2020, 22 pages.
(Continued)

*Primary Examiner* — Ryan McCulley
(74) *Attorney, Agent, or Firm* — Kilpatrick Townsned & Stockton LLP

(57) ABSTRACT

A scene modeling system accesses a set of input two-dimensional (2D) images of a three-dimensional (3D) environment, wherein the input 2D images captured from a plurality of camera orientations. The environment includes first content. The scene modeling system applies a scene generation model to the set of input 2D images to generate a 3D remix scene. Applying the scene generation model includes configuring the scene generation model using at least a 2D discriminator and a 3D discriminator. Applying the scene generation model includes transmitting, for display via a user interface, the 3D remix scene. The 3D remix scene includes second content that is different from the first content.

20 Claims, 7 Drawing Sheets

(56) References Cited

PUBLICATIONS

Alemi et al., Fixing a Broken ELBO, Proceedings of Machine Learning Research, vol. 80, Available Online at: https://proceedings.mlr.press/v80/alemi18a.html, Feb. 2018, 10 pages.

Aliev et al., Neural Point-Based Graphics, European Conference on Computer Vision, Neural point-based graphics, Available online at: arXiv:1906.08240v3.2, Apr. 5, 2020, pp. 1-16.

Aneja et al., Ncp-Vae: Variational Autoencoders With Noise Contrastive Priors, International Conference on Learning Representations, Nov. 3, 2021, 25 pages.

Arjovsky et al., Wasserstein GAN, Available online at https://arxiv.org/pdf/1701.07875.pdf, Dec. 6, 2017, 32 pages.

Barron et al., Mip-Nerf: A Multiscale Representation for Anti-Aliasing Neural Radiance Fields, Computer Vision and Pattern Recognition, Available online at: arXiv:2103.13415.2,4, Aug. 14, 2021, pp. 5855-5864.

Ben-Hamu et al., Multi-chart Generative Surface Modeling, ACM Transactions on Graphics (TOG), vol. 37, No. 6, Nov. 2018, pp. 215:1-215:15.

Bouritsas et al., Neural 3D Morphable Models: Spiral Convolutional Networks for 3D Shape Representation Learning and Generation, International Conference on Computer Vision, Available online at: https://arxiv.org/pdf/1905.02876v2.pdf, May 9, 2019, 10 pages.

Brock et al., Large Scale GAN Training for High Fidelity Natural Image Synthesis, i International Conference on Learning Representations Available Online at: https://arxiv.org/pdf/1809.11096.pdf&org=deepmind, Feb. 25, 2019, pp. 1-35.

Chan et al., pi-GAN: Periodic Implicit Generative Adversarial Networks for 3D-Aware Image Synthesis, Computer Vision and Pattern Recognition, Available online at: https://arxiv.org/pdf/2012.00926.pdf, Apr. 5, 2021, 16 pages.

Chen et al., MVSNeRF: Fast Generalizable Radiance Field Reconstruction from Multi-View Stereo, Computer Vision and Pattern Recognition, Available online at: https://arxiv.org/abs/2103.15595, Aug. 24, 2021, 13 pages.

Cosmo et al., LIMP: Learning Latent Shape Representations with Metric Preservation Priors, European Conference on Computer Vision, Available online at: https://arxiv.org/abs/2003.12283, Sep. 2, 2020, 24 pages.

Devries et al., Unconstrained Scene Generation with Locally Conditioned Radiance Fields, Computer Vision and Pattern Recognition, Available online at: https://arxiv.org/pdf/2104.00670.pdf, Apr. 1, 2021, 17 pages.

Dinh et al., Density estimation using Real NVP, Machine Learning, Available online at: https://arxiv.org/pdf/1605.08803.pdf, Feb. 27, 2017, 32 pages.

Dinh et al., NICE: Non-linear Independent Components Estimation, Machine Learning, Available online at: https://arxiv.org/pdf/1410.8516.pdf, Apr. 10, 2015, 13 pages.

Gadelha et al., Learning Generative Models of Shape Handles, Computer Vision and Pattern Recognition, Available online at: https://arxiv.org/abs/2004.03028, Apr. 6, 2020, 11 pages.

Garbin et al., FastNeRF: High-Fidelity Neural Rendering at 200FPS, Computer Vision and Pattern Recognition, Available online at: https://arxiv.org/abs/2103.10380, Apr. 15, 2021, 20 pages.

Grover et al., Flow-GAN: Combining Maximum Likelihood and Adversarial Learning in Generative Models, Association for the Advancement of Artificial Intelligence, Available online at: https://arxiv.org/pdf/1705.08868.pdf, Jan. 3, 2018, 10 pages.

Gu et al., Style NeRF: A Style-based 3D-Aware Generator for High-resolution Image Synthesis, Computer Vision and Pattern Recognition, Available online at: https://arxiv.org/abs/2110.08985, Oct. 18, 2021, 24 pages.

Guo et al., Fast and Explicit Neural View Synthesis, Computer Vision and Pattern Recognition, Available online at: https://arxiv.org/pdf/2107.05775.pdf, Dec. 8, 2021, 21 pages.

Guo et al., MaterialGAN: Reflectance Capture using a Generative SVBRDF Model, Computer Vision and Pattern Recognition, vol. 39, No. 6, Available online at: https://arxiv.org/pdf/2010.00114.pdf, Sep. 30, 2020, pp. 254:1-254:13.

Harkonen et al., GANSpace: Discovering Interpretable GAN Controls, Computer Vision and Pattern Recognition, Available online at: https://arxiv.org/pdf/2004.02546.pdf, Dec. 14, 2020, 29 pages.

Hedman et al., Baking Neural Radiance Fields for Real-Time View Synthesis, International Conference on Computer Vision, Mar. 26, 2021, pp. 5875-5884.

Henzler, Escaping Plato's Cave: 3D Shape from Adversarial Rendering, International Conference on Computer Vision, Oct. 2019, pp. 9984-9993.

Henzler et al., Learning a Neural 3D Texture Space from 2D Exemplars, Computer Vision and Pattern Recognition, Dec. 2019, 9 pages.

Higgins et al., β-VAE: Learning Basic Visual Concepts with a Constrained Variational Framework, Conference paper at ICLR, Nov. 2016, 13 pages.

Hinz et al., Improved Techniques for Training Single-Image GANs, Proceedings of the IEEE/CVF Winter Conference on Applications of Computer Vision, 2021, pp. 1300-1309.

Isola et al., Image-to-Image Translation with Conditional Adversarial Networks, IEEE Conference on Computer Vision and Pattern Recognition, Nov. 26, 2018, 17 pages.

Jolicoeur-Martineau et al., Adversarial Score Matching and Improved Sampling for Image Generation, Available online at: https://arxiv.org/pdf/2009.05475.pdf, Oct. 10, 2020, 29 pages.

Kar et al., Meta-Sim: Learning to Generate Synthetic Datasets, International Conference on Computer Vision, Apr. 2019, pp. 4551-4560.

Karnewar et al., MSG-GAN: Multi-Scale Gradients for Generative Adversarial Networks, Institute of Electrical and Electronics Engineers, Computer Vision and Pattern Recognition, Jun. 12, 2020, pp. 7799-7808.

Karnewar et al., ReLU Fields: The Little Non-Linearity That Could, in Proceedings of Siggraph, vol. 41, No. 4, Jul. 3, 2023, 8 pages.

Karras et al., A Style-Based Generator Architecture for Generative Adversarial Networks, in Proceedings of the IEEE Conference on Computer Vision and Pattern Recognition, Jun. 2019, pp. 4401-4410.

Karras et al., Alias-Free Generative Adversarial Networks, in Proceedings of NeurIPS, Oct. 18, 2021, 31 pages.

Karras et al., Analyzing and Improving the Image Quality of StyleGAN, in Proceedings of the IEEE/CVF Conference on Computer Vision and Pattern Recognition, Jun. 14, 2020, pp. 8110-8119.

Karras et al., Progressive Growing of GANs for Improved Quality, Stability, and Variation, in International Conference on Learning Representations, Feb. 26, 2018, pp. 1-26.

Karras et al., Training Generative Adversarial Networks with Limited Data, 34th Conference on Neural Information Processing Systems, Oct. 7, 2020, pp. 1-37.

Kim et al., DriveGAN: Towards A Controllable High-Quality Neural Simulation, Institute of Electrical and Electronics Engineers, Conference on Computer Vision and Pattern Recognition, Apr. 30, 2021, pp. 5820-5829.

Kingma et al., Auto-Encoding Variational Bayes, Available online at: https://arxiv.org/abs/1312.6114, Dec. 10, 2022, 14 pages.

Kingma et al., Glow: Generative Flow with Invertible 1×1 Convolutions, Available online at: https://arxiv.org/pdf/1807.03039.pdf, Jul. 10, 2018, 15 pages.

Larsen et al., Autoencoding Beyond Pixels Using a Learned Similarity Metric, International Conference on Machine Learning, Feb. 10, 2016, 8 pages.

Max, Optical Models for Direct Volume Rendering, Institute of Electrical and Electronics Engineers, Transactions on Visualization and Computer Graphics, Jun. 1995, 20 pages.

Mildenhall et al., Local Light Field Fusion: Practical View Synthesis with Prescriptive Sampling Guidelines, ACM Transactions on Graphics, vol. 38, No. 4, May 2, 2019, pp. 29:2-29:14.

Mildenhall et al., NeRF: Representing Scenes as Neural Radiance Fields for View Synthesis, European Conference on Computer Vision, Aug. 3, 2020, 25 pages.

(56) References Cited

PUBLICATIONS

Nash et al., PolyGen: An Autoregressive Generative Model of 3D Meshes, International Conference on Machine Learning, Available online at: Feb. 23, 2020, 16 pages.

Nguyen et al., RGBD-Net: Predicting Color and Depth Images for Novel Views Synthesis, Available online at: https://arxiv.org/pdf/2011.14398.pdf, Jul. 9, 2021, 19 pages.

Nguyen-Phuoc et al., BlockGAN: Learning 3D Object-aware Scene Representations from Unlabelled Images, Available online at: https://arxiv.org/abs/2002.08988, Dec. 2, 2020, pp. 1-24.

Nguyen-Phuoc et al., HoloGAN: Unsupervised Learning of 3D Representations from Natural Images, Available online at: https://arxiv.org/pdf/1904.01326.pdf, Oct. 1, 2019, 10 pages.

Niemeyer et al., Giraffe: Representing Scenes as Compositional Generative Neural Feature Fields, Available online at: https://arxiv.org/pdf/2011.12100.pdf, Apr. 29, 2021, 12 pages.

Ost et al., Neural Scene Graphs for Dynamic Scenes, Available online at: https://arxiv.org/pdf/2011.10379.pdf, Mar. 5, 2021, pp. 1-11.

Pidhorskyi et al., Adversarial Latent Autoencoders, in Proceedings of the IEEE/CVF Conference on Computer Vision and Pattern Recognition, Available Online at: https://arxiv.org/pdf/2004.04467.pdf, Apr. 9, 2020, 10 pages.

Reiser et al., KiloNeRF: Speeding up Neural Radiance Fields with Thousands of Tiny MLPs, Available Online at: https://arxiv.org/pdf/2103.13744.pdf, Aug. 2, 2021, 11 pages.

Schonberger et al., Structure-from-Motion Revisited, Available online at: https://openaccess.thecvf.com/content_cvpr_2016/papers/Schonberger_Structure-From-Motion_Revisited_CVPR_2016_paper.pdf, Jun. 2016, pp. 4104-4113.

Schwarz et al., GRAF: Generative Radiance Fields for 3D-Aware Image Synthesis, Available online at: https://arxiv.org/abs/2007.02442, Mar. 30, 2021, pp. 1-13.

Shaham et al., SinGAN: Learning a Generative Model from a Single Natural Image, Available online at: https://arxiv.org/pdf/1905.01164.pdf, Sep. 4, 2019, 11 pages.

Shen et al., InterFaceGAN: Interpreting the Disentangled Face Representation Learned by GANs, Institute of Electrical and Electronics Engineers Transactions on Pattern Analysis and Machine Intelligence, Oct. 29, 2020, pp. 1-16.

Song et al., Improved Techniques for Training Score-based Generative Models, Available online at: https://proceedings.neurips.cc/paper/2020/file/92c3b916311a5517d9290576e3ea37ad-Paper.pdf, Dec. 6, 2020, pp. 1-11.

Song et al., Maximum Likelihood Training of Score-Based Diffusion Models, Available online at: https://arxiv.org/pdf/2101.09258.pdf, Oct. 21, 2021, pp. 1-24.

Tewari et al., State of the Art on Neural Rendering, Computer Graphics Forum, Available online at: https://arxiv.org/pdf/2004.03805.pdf, Apr. 8, 2020, 27 pages.

Vahdat et al., Nvae: A Deep Hierarchical Variational Autoencoder, Available online at: https://arxiv.org/pdf/2007.03898.pdf, Jan. 8, 2021, pp. 1-21.

Wang et al., High-Resolution Image Synthesis and Semantic Manipulation with Conditional GANs, Proceedings of the IEEE Conference on Computer Vision and Pattern Recognition, Aug. 20, 2018, pp. 8798-8807.

Wu et al., Learning a Probabilistic Latent Space of Object Shapes via 3D Generative-Adversarial Modeling, 29th Conference on Neural Information Processing Systems (NIPS 2016), Barcelona, Spain, Jan. 4, 2017, pp. 1-11.

Yu et al., pixelNeRF: Neural Radiance Fields from One or Few Images, Available online at: https://arxiv.org/pdf/2012.02190.pdf, May 30, 2021, 20 pages.

Yu et al., PlenOctrees for Real-Time Rendering of Neural Radiance Fields, Computer Vision and Pattern Recognition, Available online at: https://arxiv.org/pdf/2103.14024.pdf, Aug. 17, 2021, 18 pages.

Zhang et al., Image GANs meet Differentiable Rendering for Inverse Graphics and Interpretable 3D Neural Rendering, Available online at: https://arxiv.org/pdf/2010.09125.pdf, Apr. 20, 2021, pp. 1-25.

Zhang et al., NeRF++: Analyzing and Improving Neural Radiance Fields, Available online at https://arxiv.org/pdf/2010.07492.pdf, Oct. 21, 2020, pp. 1-9.

Zhou et al., CIPS-3D: A 3D-Aware Generator of GANs Based on Conditionally-Independent Pixel Synthesis, Available online at: https://arxiv.org/abs/2110.09788, Oct. 19, 2021, pp. 1-10.

Zhou et al., Stereo Magnification: Learning View Synthesis using Multiplane Images, ACM Transactions on 68 Graphics, vol. 37, No. 4, Aug. 2018, pp. 65:1-65:12.

\* cited by examiner

200

210

ACCESSING A PLURALITY OF TWO-DIMENSIONAL (2D) IMAGES OF A THREE DIMENSIONAL (3D) ENVIRONMENT

220

APPLYING A SCENE GENERATION MODEL TO THE PLURALITY OF 2D IMAGES TO GENERATE A 3D REMIX SCENE, WHEREIN THE 3D SCENE INCLUDES CONTENT THAT IS DIFFERENT FROM CONTENT IN THE ENVIRONMENT, WHEREIN THE SCENE GENERATION MODEL IS TRAINED IN A STAGEWISE MANNER AT EACH RESOLUTION IN A SEQUENCE OF INCREASING RESOLUTIONS

230

DISPLAYING, VIA A USER INTERFACE, THE 3D REMIX SCENE

310
FOR EACH OF A SET OF RESOLUTION LEVELS, GENERATE A 3D REFERENCE GRID FROM THE SET OF INPUT 2D IMAGES

320
TRAIN A GENERATOR MODEL TO GENERATE A 3D FEATURE GRID AT A (NEXT) RESOLUTION

321
GENERATE, USING THE GENERATOR MODEL, A 3D FEATURE GRID BASED ON THE SET OF INPUT 2D IMAGES

322
SELECT A 3D PATCH FROM THE GENERATED 3D FEATURE GRID AND RENDER A 2D PATCH FROM THE SELECTED 3D PATCH

323
SELECT A REFERENCE 3D PATCH FROM THE REFERENCE 3D GRID AND RENDER A REFERENCE 2D PATCH FROM THE REFERENCE 3D PATCH

324
COMPARE, USING A FIRST DISCRIMINATOR, THE RENDERED 2D PATCH WITH THE RENDERED REFERENCE 2D PATCH

325
COMPARE, USING A SECOND DISCRIMINATOR, THE SELECTED 3D PATCH WITH THE SELECTED REFERENCE 3D PATCH

326
MODIFY ONE OR MORE PARAMETERS OF THE GENERATOR MODEL BASED ON ONE OR MORE OF THE COMPARISON OF 324 OR THE COMPARISON OF 325.

330 FINAL RESOLUTION REACHED? NO → (back to 323) / YES →

340
STORE TRAINED GENERATOR MODEL

LEARNING A 3D SCENE GENERATION MODEL FROM IMAGES OF A SELF-SIMILAR SCENE

TECHNICAL FIELD

This disclosure generally relates to techniques for using machine learning models to model three dimensional (3D) scenes from sets of two dimensional (2D) images. More specifically, but not by way of limitation, this disclosure relates to improvements to training machine learning models for generating new content for 3D scenes modeled from sets of 2D images.

BACKGROUND

Conventional modeling systems, for example Neural Radiance Field (NeRF) networks, can model a 3D scene from a set of 2D images. Further, conventional scene generation models can generate remixes of 2D or 3D content, which are similar to an existing 2D input (e.g., 2D image) or 3D input (e.g., 3D scene) but have different content. For example, the different content in remixes can include a different positioning/arrangement of objects depicted, a quantity of objects depicted, or other depiction that does not correspond to an input image/scene. However, 3D remixes generated using conventional scene generation models often suffer from defects including shape distortions and chromatic noise.

SUMMARY

The present disclosure describes techniques for using a scene generation model to generate 3D remixes of a 3D scene based on a set of input 2D images. A scene modeling system accesses a set of input two-dimensional (2D) images of a three-dimensional (3D) environment, wherein the input 2D images captured from a plurality of camera orientations. The environment includes first content. The scene modeling system applies a scene generation model to the set of input 2D images to generate a 3D remix scene. Applying the scene generation model includes configuring the scene generation model using at least a 2D discriminator and a 3D discriminator. Applying the scene generation model includes transmitting, for display via a user interface, the 3D remix scene. The 3D remix scene includes second content that is different from the first content.

Various embodiments are described herein, including methods, systems, non-transitory computer-readable storage media storing programs, code, or instructions executable by one or more processing devices, and the like. These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 2 depicts a method for using a scene generation model to generate 3D remix scenes based on a set of input 2D images of a physical scene, according to certain embodiments disclosed herein.

FIG. 3 depicts a method for training a scene generation model to generate 3D remix scenes based on a set of input 2D images of a physical scene, according to certain embodiments disclosed herein.

DETAILED DESCRIPTION

Figure 1:
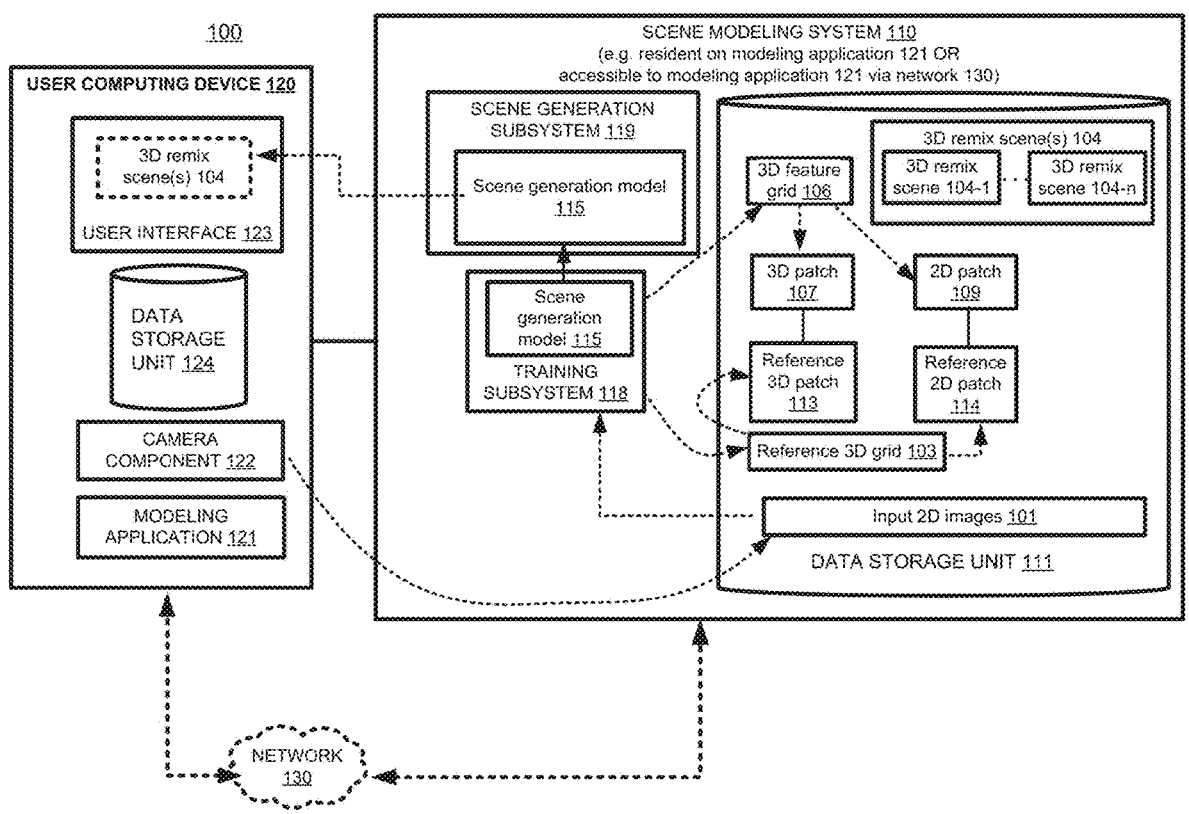
FIG. 1 depicts an example of a computing environment for using a scene generation model to generate 3D remix scenes based on a set of input 2D images of a physical scene, according to certain embodiments disclosed herein.

In the following description, for the purposes of explanation, specific details are set forth in order to provide a thorough understanding of certain embodiments. However, it will be apparent that various embodiments may be practiced without these specific details. The figures and description are not intended to be restrictive. The words "exemplary" or "example" are used herein to mean "serving as an example, instance, or illustration." Any embodiment or design described herein as "exemplary" or "example" is not necessarily to be construed as preferred or advantageous over other embodiments or designs.

Conventional modeling systems, for example Neural Radiance Field (NeRF) networks, can model a 3D scene from a set of 2D images. Also, conventional generative networks can generate realistic looking 2D remixes, which are similar to existing 2D images but have different content. For example, the different content in remixes can include a different positioning/arrangement and/or quantity of objects depicted in an image. However, conventional systems for generating 3D scene remixes fail to produce realistic 3D scenes. For example, conventional scene generation models may generate 3D remixes having minor shape distortions and chromatic noise, which is caused by only using a 3D discriminator, which does not model free space in a volume and also results in replication of inside regions of occupied space that may contain random values. In some instances, conventional scene generation models may only use 2D discriminators on rendered images of 3D remixes. In these instances, the 2D discriminators may either be trained on patches that are too small, resulting in a 2D discriminator that is too weak to inform the scene generation model, or may be trained on patches that are too large, resulting in the 2D discriminator merely memorizing an initial reconstruction.

Certain embodiments described herein address the limitations of conventional scene generating models by providing a scene generating model that is trained, progressively, using both a 2D discriminator and a 3D discriminator, over a series of increasing resolutions. The use of both the 2D discriminator and the 3D discriminator to train the scene generation model, as well as training the model in the progressive, stagewise manner over a sequence of increasing resolutions described herein results in a scene generation model that can produce 3D remix scenes that can be rendered from arbitrary camera configurations without any flickering or spatio-temporal artifacts, which occur in conventional scene generating models.

The following non-limiting example is provided to introduce certain embodiments. In this example, a scene modeling system accesses a set of 2D images of a physical environment. For example, the physical environment may be a room or an outdoor space. The physical environment can also include objects. For example, the physical environment includes a section of beach, 2 beach umbrellas, a cooler, and/or other real world objects of the physical environment. In some instances, the 2D images of the physical environment are captured by a user computing device (e.g., a camera device or a mobile device able to capture images) from various camera orientations (e.g., at various positions within the physical scene and at various camera angles).

The scene modeling system applies a trained scene generation model to the set of 2D images to generate a 3D remix scene, wherein the 3D remix scene includes content that is different from content in the physical environment, wherein the scene generation model is trained in a stagewise manner at each resolution of a sequence of increasing resolutions to generate 3D remix scenes at the respective resolution. For example, the 3D remix scene includes the same section of beach as the original environment but includes one beach umbrella instead of 2 beach umbrellas, a cooler in a different position than the cooler in the physical environment.

The scene modeling system displays, via a user interface, the 3D remix scene. In certain embodiments, displaying the 3D remix scene includes capturing one or more 2D images from within the 3D remix scene at one or more virtual camera positions/orientations. In certain embodiments, displaying the 3D remix scene includes displaying a virtual camera view of the 3D remix scene such that a user can change a position/orientation of the virtual camera and, in some instances, capture images of the 3D remix scene.

The embodiments described herein, specifically training the scene generation model in a stagewise manner at each resolution of a sequence of increasing resolutions as well as using both a 2D discriminator and a 3D discriminator to train the scene generation model, significantly improves the functioning of modeling interfaces over conventional modeling interfaces. As previously discussed, in conventional modeling interfaces, conventional scene generation models may generate 3D remix scenes having minor shape distortions and chromatic noise, which is caused by only using a 3D discriminator, which does not model free space in a volume and also results in replication of inside regions of occupied space that may contain random values. In some instances, conventional scene generation models may only use 2D discriminators on rendered images of 3D remixes. In these instances, the 2D discriminators may either be trained on patches that are too small, resulting in a 2D discriminator that is too weak to inform the scene generation model, or may be trained on patches that are too large, resulting in the 2D discriminator merely memorizing an initial reconstruction. The embodiments described herein incorporate a combination of a 2D discriminator and a 3D discriminator for training the scene generation model, which reduces and/or eliminates the distortions in 3D remix scenes that are encountered when using the conventional approaches. Specifically, compared to conventional approaches, the scene generation model described herein obtains significantly more scene diversity because it uses a patch-based generative model for 3D scenes, which enables the scene generation model to track an identity of objects (e.g., balloons, blocks, fish, chalk, etc.) and create plausible 3D content variations of these objects (e.g., balloons floating in air, blocks meaningfully stacked) for 3D remix scenes. The embodiments described herein incorporate a stagewise training scheme for training the scene generation model to generate 3D remix scenes at each of a sequence of progressively increasing resolutions, which reduces and/or eliminates the distortions in 3D remix scenes that are encountered when using the conventional approaches.

Example Operating Environment for Using a Scene Generation Model to Generate 3D Remix Scenes Based on a Set of Input 2D Images of a Physical Scene Referring now to the drawings, FIG. 1 depicts an example of a computing environment 100 for using a scene generation model to generate 3D remix scenes 104 based on a set of input 2D images 101 of a physical scene, according to certain embodiments disclosed herein. The computing environment 100 includes, as depicted in FIG. 1, a scene modeling system 110, which can include one or more processing devices that execute a scene generation subsystem 119 and a training subsystem 118. In certain embodiments, the scene modeling system 110 is a component of a user computing device 120 and operates on the user computing device 120. In certain embodiments, as also depicted in FIG. 1, the scene modeling system 110, including the scene generation subsystem 119, the training subsystem 118, and the data storage unit 111, is a network server or other com 119 accesses or otherwise receives input 2D images 101 of a physical environment (e.g., a physical scene). For example, the scene generation subsystem 115 accesses the input 2D images from a data storage unit 111 of the scene modeling system 110 or otherwise accessible to the scene modeling system 110. In certain embodiments, a user of the user computing device 120 captures each of the set of input 2D images 101 via a camera component 122 of a user computing device 120 and the scene generation subsystem 115 receives the set of input 2D images 101 captured via the camera component 122.

The scene modeling system 110 generates one or more 3D remix scenes 104 based on the set of input 2D images 101. For example, the scene generation subsystem 118 generates n 3D remix scenes 104 (e.g., 3D remix scene 104-1 . . . 3D remix scene 104-*n*) by applying a trained scene generation model 115 to the set of input 2D images 101. An example 3D remix scene 104 includes content which is different from a physical scene associated with the set of input 2D images 101. For example, the different content in the 3D remix scene 104 can include a different positioning/arrangement of objects, a different quantity of objects, or other content that does not correspond to the physical scene. For example, the physical scene is of a section of beach with 3 beach chairs, 2 beach umbrellas, and a cooler. In this example, the 3D remix scene 104 could include 1 beach chair that is similar in appearance to the 3 beach chairs of the physical scene, 1 beach umbrella that is similar in appearance to the 2 beach umbrellas of the physical scene, and 2 coolers that are similar in appearance to the cooler of the physical scene. In an example, the physical scene includes a cooler that is arranged under an umbrella and in the 3D remix scene 104 the cooler is arranged beside but not under the umbrella. In certain embodiments, the 3D remix scene 104 is a 3D virtual space from which one or more 2D images can be captured via a virtual camera positioned and oriented within the 3D virtual space. In certain embodiments, the 3D remix scene 104 output by the scene generation model 115 includes one or more 2D images taken at one or more virtual camera positions/orientations within the 3D remix scene 104 generated by the scene generation model 115.

Figure 4:
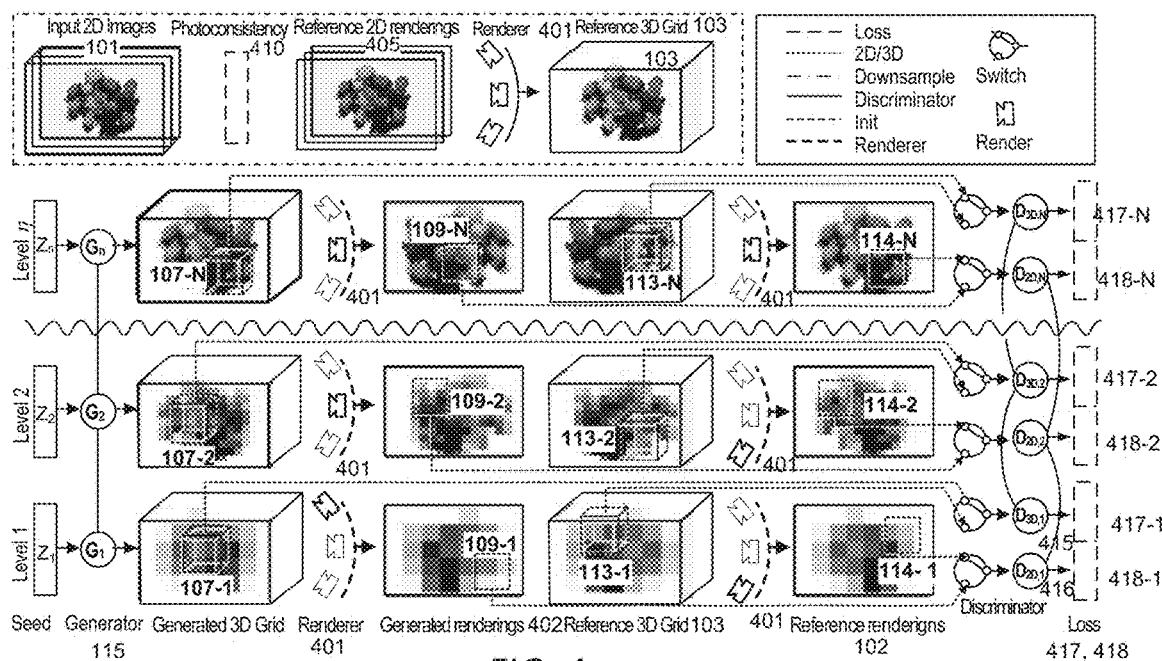
FIG. 4 illustrates a process of training a scene generation model 115, according to certain embodiments described herein.
Figure 5:
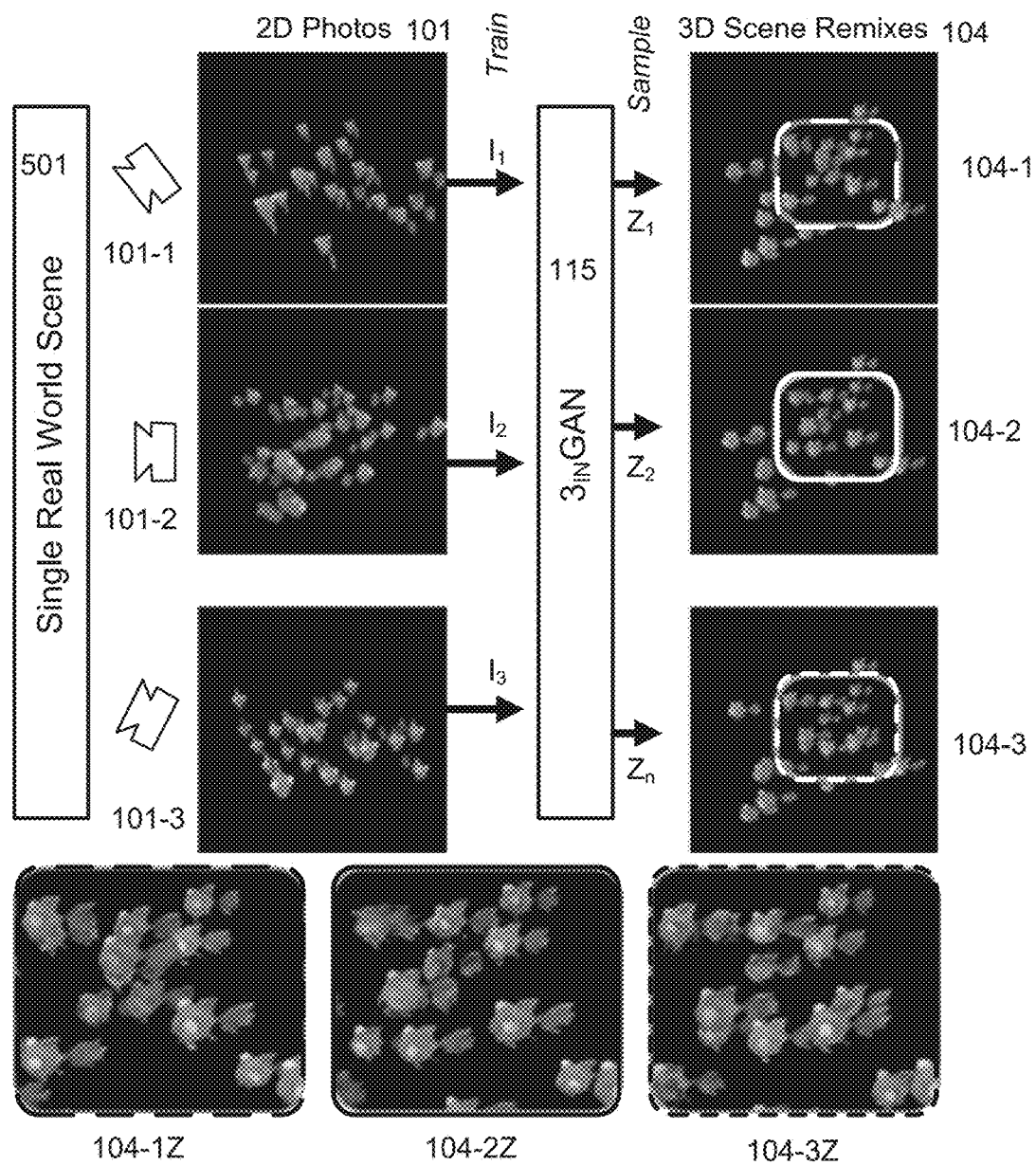
FIG. 5 illustrates example 3D remix scenes generated using the scene generation model described herein, according to certain embodiments described herein.

In certain embodiments, the training subsystem 118 trains the scene generation model 115 on the set of input 2D images 101 to generate 3D remix scenes 104 based on the set of input 2D images 101. Further details about training the scene generation model 115 are described in FIG. 3 and FIG. 4. FIG. 5 illustrates generating a 3D remix scene 104 from a set of input 2D images 101.

The scene modeling system 110 includes a data storage unit 111. An example data storage unit 111 is accessible to the scene modeling system 110 and stores data for the scene modeling system 110. In some instances, the data storage unit 111 stores a set of input 2D images 101 and reference 3D grids 103 generated by the scene generation subsystem 119 for each of a sequence of resolutions. In some instances, the data storage unit 111 stores 3D patches 107 and 2D patches 109 of the 3D feature grids 106, and reference 3D patches 113 and reference 2D patches 114, generated during training of the scene generation model 115 at each resolution of the sequence of resolutions to generate a 3D remix scene at the respective resolution. In some instances, the data storage unit 111 stores output 3D remix scenes 104 generated by the scene generation subsystem 119. In some instances, the data storage unit 111 stores the trained scene generation model 115.

An example user computing device 120 includes a modeling application 121, a camera component 122, a user interface 123, and a data storage unit 124. In certain embodiments, the user computing device 120 is a smart phone device, a personal computer (PC), a tablet device, or other user computing device 120. In some embodiments, the user computing device 120, as depicted in FIG. 1, includes the scene modeling system 110. For example, the scene generation subsystem 119 and training subsystem 118 are components of the modeling application 121 and the data storage unit 124 performs functions described herein as being performed by the data storage unit 111. In some embodiments, as depicted in FIG. 1, the user computing device 120 is a separate system from the scene modeling system 110 and communicates with the scene modeling system 110 via the network 130.

The modeling application 121, in some embodiments, is associated with a scene modeling service and the user downloads the modeling application 121 on the user computing device 120. For example, the user accesses an application store or a website of the scene modeling service using the user computing device 120 and requests to download the modeling application 121 on the user computing device 120. The modeling application 121 operates on the user computing device 120 and enables a user of the user computing device 120 to generate 3D remix scenes 104 from a set of input 2D images 101. The modeling application 121 enables the user to interact, via the user interface 123 with the modeling application 121. The modeling application 121 can communicate with the user interface 123 to receive one or more inputs from the user. The modeling application 121 can instruct the user interface 123 to display the 3D remix scene 104, or one or more output 2D images generated based on the 3D remix scene 104, generated by the scene generation subsystem 119. In some embodiments, the modeling application 121 communicates with one or more of the scene generation subsystem 119, the training subsystem 118, or the data storage unit 111 of the scene modeling system 110.

In certain embodiments, the modeling application 121 includes the scene generation subsystem 119 and the training subsystem 118 and performs the operations described herein as being performed by the subsystems 119 and 118. For example, in certain embodiments, the modeling application 121 of the user computing device 120 can generate one or more 3D remix scenes 104 based on a set of input 2D images 101.

In certain embodiments the camera component 122 is a camera module or camera device component of the user computing device 110 that is able to capture images and/or video of an environment of the camera component 122. In some embodiments, the camera component 122 is a separate device from the user computing device 110 and is communicatively coupled to the user computing device 110. The camera component 122 communicates with the modeling application 121 and transmits, to the modeling application 121, one or more input 2D images (or video) captured by the camera component 122. For example, the one or more input 2D images are of a 3D physical scene in an environment of the user computing device camera component 122 and are captured from one or more camera component 122 positions and/or orientations within the 3D physical scene environment.

The data storage unit 124 is accessible to the user computing device 120 and stores data for the user computing device 120. In some instances, the data storage unit 124 stores a set of input 2D images 101 captured via the camera component 122 of the user computing device 120. In some instances, the data storage unit 124 stores a 3D remix scene 104 generated by the scene modeling system 110.

The user interface 123 can include a touchscreen display interface, a display device (e.g., a monitor) with a separate input device (e.g., a mouse), or other user interface 123 which can receive one or more inputs from the user and display information or provide other output to the user. For example, the user interface 123 can display a 3D remix scene 104 generated by the scene generation subsystem 119. In some instances, the user interface 123 displays a camera view of the camera component 122 and, responsive to receiving one or more inputs, instructs the camera component 122 to capture one or more input 2D images 101.

As depicted in FIG. 1, the scene modeling system 110 can receive a set of input 2D images 101 captured by the camera component 122 of the user computing device 120 and generate a 3D remix scene 104 for display via the user computing device 120 by applying a scene generation model 115 to the set of input 2D images 101. In some instances, the training subsystem 118 trains the scene generation model by generating a reference 3D grid 103 for each resolution of a sequence of progressively increasing resolutions. The training system 118 can, for each of these resolutions, train the scene generation model 115 by comparing the respective reference 3D grid 103 with a 3D feature grid 106 generated by the scene generation model 115 at the respective resolution. Specifically, the scene modeling system 110 can compare, for a resolution of the sequence of resolutions, a 3D patch 107 selected from the generated 3D feature grid 106 to a selected reference 3D patch 113 from the reference 3D grid 103 and can compare a 2D patch 109 generated from the generated 3D feature grid 106 to a reference 2D patch 114 generated from the reference 3D grid 103. The scene modeling system 110 can modify or otherwise update parameters of the scene generation model 115 based on the comparison and then further train the scene generation model 115 at a next resolution in the sequence of progressively increasing resolutions using a similar comparison of 2D and 3D patches determines from a 3D feature grid 106 generated by the scene generation model 115 for the next resolution and a reference 3D grid 103 associated with the next resolution. Further details about training the scene generation model 115 are described in FIG. 3 and FIG. 4.

The scene modeling system 110, including the scene generation subsystem 119 and the training subsystem 118, may be implemented using software (e.g., code, instructions, program) executed by one or more processing devices (e.g., processors, cores), hardware, or combinations thereof. The software may be stored on a non-transitory storage medium (e.g., on a memory component). The computing environment 100 depicted in FIG. 1 is merely an example and is not intended to unduly limit the scope of claimed embodiments. One of ordinary skill in the art would recognize many possible variations, alternatives, and modifications. For example, in some implementations, the scene modeling system 110 can be implemented using more or fewer systems or subsystems than those shown in FIG. 1, may combine two or more subsystems, or may have a different configuration or arrangement of the systems or subsystems.

Examples of Computer-Implemented Operations for Using a Scene Generation Model to Generate 3D Remix Scenes Based on a Set of Input 2D Images of a Physical Scene In the embodiments described herein, the scene modeling system 110 can generate 3D remix scenes 104 by applying a scene generation model 115 to a set of input 2D images 101. For example, a 3D remix scene 104 includes content which is different from a physical scene associated with the set of input 2D images 101. For example, the different content in the 3D remix scene 104 can include a different positioning/arrangement of objects, a different quantity of objects, or other content that does not correspond to the physical scene. In the embodiments described herein, the scene modeling system 110 can train the scene generation model 115 to generate 3D remix scenes 104. FIG. 2, FIG. 3, and FIG. 4 provide further details about these features. FIG. 5 illustrates output 2D images generated from a 3D remix scene 104 generated using the methods described herein.

FIG. 2 depicts an example of a method for using a scene generation model to generate 3D remix scenes based on a set of input 2D images of a physical scene, according to certain embodiments disclosed herein. One or more computing devices (e.g., the scene modeling system 110 or the individual subsystems contained therein) implement operations depicted in FIG. 2. For illustrative purposes, the method 200 is described with reference to certain examples depicted in the figures. Other implementations, however, are possible.

In certain embodiments described herein, the scene modeling system 110 is a component of the user computing device 120 and the operations described herein as performed by the scene modeling system 110 (or one or more of the subsystems 118 and 119 thereof) are performed by the modeling application 121 of the user computing device 120. However, in some embodiments, the scene modeling system 110 is separate from the user computing device 120 and communicates with the user computing device 120 via the network 130. In some embodiments, the scene modeling system 110 is separate from the user computing device 120 but one or more operations described herein as performed by the scene modeling system 110 (or one or more subsystems 118 and 119 thereof) are performed by the modeling application 121 of the user computing device 120.

At block 210, the method 200 involves accessing, by a scene generation subsystem 119, a plurality of two-dimensional (2D) images 101 of a three-dimensional (3D) environment. The 3D environment is a real-world or synthetic self-similar scene. For example, in some instances, may be a mountain, a beach, or other natural environment. In some instances, the environment is a manmade environment (e.g., a kitchen, a living room, an aquarium). In some instances, the environment includes one or more objects, for example, a car, a human being, buildings, animals, plants, trees, or other objects. In some instances, the scene modeling system accesses the plurality of input 2D images 101 responsive to receiving a user input. For example, a user accesses the modeling application 121 (or a web browser application) executing on the user computing device 120, selects one or more objects on the user interface 123 of the user computing device to request to generate one or more 3D remix scenes 104. The scene modeling system 110 receives the inputs of the user and accesses the plurality of input 2D images 101 responsive to receiving the user selection.

At block 220, the method 200 involves applying, by the scene generation subsystem 118, a scene generation model 115 to the plurality of input 2D images 101 to generate a 3D remix scene 104, wherein the 3D scene includes content that is different from content in the environment. In some instances, generating a 3D remix scene 104 includes generating one or more output 2D images of the 3D remix scene 104 captured from one or more virtual camera positions and/or orientations within the 3D remix scene 104. Applying the scene generation model 115 to the plurality of input 2D images 101 includes converting the set of input 2D images 101 into a 3D feature grid 106. The scene generation subsystem 115 trains the scene generation model 115 by comparing 3D patches 107 selected from the 3D feature grid 106 with reference 3D patches 113 selected from the reference 3D grid 103 and by comparing 2D patches 109 selected from 2D images rendered from the 3D feature grid 106 to reference 2D patches 114 selected from 2D images rendered from the reference 3D grid 103. The trained scene generation model 115 described herein converts spatial random latent grids into 3D feature grids 106 that include 3D remix scenes 104 of the environment at a highest resolution level in the sequence of resolutions. The output 3D remix scenes 104, in some instances, can be consistently rendered from arbitrary views.

At block 230, the method 200 involves displaying, via a user interface 123, the 3D remix scene 104. For example, the scene modeling system 110 displays the 3D remix scene 104 generated in block 220 via the user interface 123. In some embodiments, the scene modeling system 110 provides the one or more 3D remix scenes 104 for display via the user interface 123 of the user computing device 120. In some instances, the user can position and/or reposition the virtual camera within the 3D remix scene 104 using the user interface 123 and can capture one or more 2D images of the 3D remix scene 104 at the user-configured virtual camera positions/orientations.

FIG. 3 depicts an example of a method for training a scene generation model to generate 3D scene remixes 104 over a sequence of resolutions, according to certain embodiments disclosed herein. One or more computing devices (e.g., the scene modeling system 110 or the training subsystem 118) implement operations depicted in FIG. 3. For illustrative purposes, the method 300 is described with reference to certain examples depicted in the figures. Other implementations, however, are possible.

At block 310, the method 300 involves generating, by the training subsystem 118 and for each of a set of resolutions, a reference 3D grid 103 from the set of input 2D images 101. In certain embodiments, the training subsystem 118 generates the reference 3D grid 103 by separately obtaining both foreground and background data. The foreground is bound by a user-provided Axis-Aligned Bounding Box (AABB) covered by a volumetric grid, V, of fixed resolution $nV_x \times nV_y \times nV_z$ to contain feature values in a range of $(-\infty, \infty)$ that are passed through a single channel-wise Rectified Linear Unit (ReLU) to clip the values to [0,1] as density values. In some instances, the training subsystem 118 does not model a view-dependent appearance and instead approximates the scene (e.g., the environment) with Lambertian materials. The training subsystem 118 determines the background to be a constant black for synthetic scenes (e.g., manmade scenes such as a room) or, for natural scenes, the training subsystem 118 models the background using an implicit neural network, B. The implicit neural network, in some instances, is a neural radiance field (NeRF) network, for example, a NeRF++ network. In some instances, the training subsystem 118 models the background of a natural scene using the implicit neural network but without using an inverted-sphere parameterization of the natural scene.

In certain embodiments, the training system 118 does not attempt to model the entire scene perfectly but rather to provide appropriate inductive bias to a reconstruction pipeline to enable correct separation of foreground and background in a scene, so that real-world scenes can be reconstructed without requiring additional segmentation masks. In certain embodiments, the training subsystem 118 sets a camera pose (e.g., an extrinsic translation, extrinsic rotation, and intrinsic data) for each of the input 2D images 101, $C:=\{C_1, \ldots, C_{n_{2D}}\}$. Intrinsic data can include a camera focal length (field of view), a lens distortion, and a cropping. Extrinsic data can include a roll, a pitch, a yaw, and a position of the camera. In some instances, the training subsystem 118 determines the camera pose using a structure-from-motion method (e.g., ColMap). In some instances, the training subsystem 118 denotes a rendering operation to convert the 3D grid 103 (V) and the camera pose (C) into an image as R(V, C). In certain embodiments, the training subsystem 118 converts the reference 3D grid 103 and the camera pose C into an image R using an emission-absorption raymarching method. The training subsystem 118, in some instances, optimizes a photometric loss of the reference 3D grid 103, given the pose and the input 2D images 101 (R) as:

$$\arg\min_V \sum_{i=1}^{n_{2D}} \|I_i - R(V, C_i)\|_2^2, \quad (1)$$

where n represents the resolution, V represents the reference 3D grid 103, C represents the camera pose, and I represents a ground truth. For example, the ground truth, I, is a rendered image of a the real scene and $R(V, C_i)$ represents the rendered image from the 3D grid 103. In some instances, the training subsystem 118 performs a batched optimization over a predetermined number (e.g., 2048) of random rays out of all the rays having a known 2D input image 101 pixel value. In some instances, the 2D input images 101 are of size 512×512 pixels. In some instances, instead of directly optimizing for a full-resolution volume 3D grid 103, the training phase proceeds progressively in a coarse-to-fine manner. For example, initially the reference 3D grid 103 may be optimized at a resolution where each dimension is smaller by a predetermined factor (e.g. a factor of 16) and, after seeing a predetermined number (e.g. 20,000) of batches of input rays, the training subsystem 118 multiplies the 3D grid 103 resolution by two and tri-linearly upsamples the reference 3D grid 103.

In At block 320, the method 300 involves training, by the training subsystem 118, the generator model 115 to generate an output 3D feature grid 106 at an initial resolution. For example, the output 3D feature grid 106 is a 3D remix scene 104 at a particular resolution used for training the generator model 115. The training subsystem 118 uses the reference 3D grid 103 generated at block 320 for the initial resolution to train the scene generator model 115 to generate output 3D feature grids 106 at the initial resolution. In certain embodiments, the generator model 115 maps a random number z to a 3D feature grid G(z) at a coarsest resolution level, while adding fine residual details to a previous resolution level's outputs at remaining resolution levels similar to unconditional generative models learned from a single natural image (sinGAN). In certain embodiments, the scene generator model 115 is a convolutional neural network (CNN) that stagewise decodes a spatial grid of noise vectors z of size $n_z$ (e.g., using a seed dimension of 4 or other seed dimension) into the output 3D feature grid 106 of a given resolution level.

In certain embodiments, implementing block 320 involves implementing each of subblocks 321, 322, 323, 324, 325, and 326. For example, the training subsystem 118 trains the scene generator model 115 progressively, by first producing output 3D reference grids 106 (e.g. output 3D remix scenes 104) of reduced resolution and, at convergence, the training subsystem 118 adds layers and trains the scene generation model 115 to produce output 3D feature grids 106 (output 3D remix scenes 104) of increasingly higher resolution until a predetermined highest resolution is reached, wherein the scene generation model 115 is trained to generate 3D remix scenes 104 at a highest resolution level of the sequence of resolution levels. The training subsystem 118 freezes previously trained layers (e.g., for previous resolution levels prior to the current resolution level) to avoid GAN training diverging. In some instances, the training subsystem 118 uses a reconstruction loss that enforces a single fixed seed z* to map to the reference 3D grid 103 and the training subsystem 118 supervises the fixed seed loss using a means squared error (MSE) approach over the generated 3D feature grids 106 as well as rendered 3D patches 107.

At subblock 321, the method for implementing block 320 involves generating, using the generator model 115, a 3D feature grid 106 based on the set of input 2D images 101. For example, the training subsystem 118 applies the scene generator model 115 to the set of input 2D images 101 to generate a 3D feature grid 106 (which is an output 3D remix scene 104 at a particular resolution level) at the current resolution level. As previously discussed, each of subblocks 321-326 is performed for each of a sequence of increasing resolution levels.

At subblock 322, the method for implementing block 320 involves selecting a 3D patch 107 from the generated 3D feature grid 106 and rendering a 2D patch 109 from the generated 3D feature grid 106. For example, the training subsystem 118 randomly selects a 3D patch 107 from the generated 3D feature grid 106 for the current resolution level. For example, the 3D patch 107 is a predetermined size volume extracted from the generated 3D feature grid 106 at a random location within the 3D feature grid 106. In some instances, the training subsystem 118 renders a 2D patch 109 from the generated 3D feature grid 106 (which is a 3D scene remix 104) by capturing a 2D image at a random virtual camera location and orientation within the 3D feature grid 106. In certain embodiments, the training subsystem 118 models a distribution of poses D that uniformly samples camera locations to point at a center of a hemisphere and where focal length is varied stagewise linearly and the value at the final stage corresponds to actual camera intrinsics. In some instances, the training subsystem 118 determines a distribution to discriminate represented as:

$$P_F^{2D} = P_{2D}(R(G(z), D)) \text{ and } P_R^{2D} = P_{2D}(R(V, D)), \quad (2)$$

where $P_{2D}(\ )$ is an operator to extract a random patch from a 2D image. In some instances, $P_R^{2D}$ is not defined as $P_R^{2D}=P_{2D}(I)$, as this definition would limit use of samples only from the limit set of known 2D image patches. Using Equation (2), trusting that the reference 3D feature grid 106 has been extracted properly, the reference 3D feature grid 106 is sampled from arbitrary views for a much richer set.

At subblock 323, the method for implementing block 330 involves selecting a reference 3D patch 113 from the reference 3D grid 103 and rendering a reference 2D patch 114 from the reference 3D grid 103. For example, the training subsystem 118 randomly selects a reference 3D patch 113 from the reference 3D grid 103 for the current resolution level. For example, the reference 3D patch 113 is a predetermined size volume extracted from the reference 3D grid 103 at a random location within the reference 3D grid 103. In certain examples, the predetermined size volume of the reference 3D patch 113 is the same size volume as a volume of the 3D patch 107 extracted from the generated 3D feature grid 106. In some instances, the training subsystem 118 renders a reference 2D patch 114 from the reference 3D grid 103 (which is a 3D scene remix 104) by capturing a 2D image at a random virtual camera location and orientation within the reference 3D grid 103. In some instances, the training subsystem 118

As previously discussed, the training subsystem 118, for a current resolution level, determines, for each of the reference 3D grid 103 and the generated feature grid 106, 2D patches (e.g., the 2D patch 109 and the reference 2D patch 114) and 3D patches (e.g., the 3D patch 107 and the reference 3D patch 113). As described in the following subblocks, 324 and 325, these 2D patches and 3D patches are separately compared to evaluate a performance of the scene generation model 115 for generating 3D remix scenes 104 at the current resolution level. This progressive training of the scene generation model 115 by comparison of 2D and 3D patches between a predetermined reference 3D grid 103 and a 3D feature grid 106 generated by the scene generation model 115 at each resolution level of a set of increasing resolution levels is also illustrated in FIG. 4.

At subblock 324, the method for implementing block 320 involves comparing, using a first discriminator, the rendered 2D patch 109 with the rendered reference 2D patch 214. The training subsystem 118 uses a 2D discriminator to discriminate 2D patches 109 of renderings of the generated 3D feature grid 106 to reference 2D patches 114 rendered from the reference 3D grid 103.

At subblock 325, the method for implementing block 320 involves comparing, using a second discriminator, the selected 3D patch 107 with the selected reference 3D patch 113. In some instances, the training subsystem 118 determines a distribution over which to discriminate that can be represented as:

$$P_F^{3D} = P_{3D}(G(z)) \text{ and } P_R^{3D} = P_{3D}(V) \quad (3)$$

where $P_{3D}(V)$ is an operator to extract a random patch from a 3D feature grid 106 (V).

At subblock 326, the method for implementing block 320 involves modifying one or more parameters of the scene generator model 115 based on one or more of the comparison of block 324 or the comparison of block 325. In certain embodiments, in the comparison steps of subblocks 324 and 325, the training subsystem 118 determines a loss (L) using a loss function. For example, the training system 118 can use a Wasserstein generative adversarial network (WGAN) to both distributions as well as the reconstruction losses (in both 2D and 3D) weighted by two pairs of two factors, $\gamma_{2D}$, $\gamma_{3D}$, $\rho_{2D}$, and $\rho_{3D}$, represented as follows:

$$\mathcal{L} = \gamma_{2D} \cdot wgan(p_R^{3D}, p_F^{3D}) + \gamma_{3D} \cdot wgan(P_R^{2D}, P_F^{2D}) + \quad (4)$$
$$\rho_{2D} \cdot \mathbb{E}_{C_\epsilon D}[\|R(G(z^*), C) - \mathcal{R}(V, C)\|_2^2] + \rho_{3D} \cdot \|G(z^*) - V\|_2^2$$

In some embodiments, the training system sets the factors $\gamma_{2D}=\gamma_{3D}=1.0$ and sets the factors $\rho_{2D}=\rho_{3D}=10$. In certain embodiments, the training subsystem 118 modifies parameters of the of the scene generation model 115 based on the loss determined using Equation (4). In certain embodiments, the training subsystem 118 iteratively performs block 320 (including each of subblocks 321-326) at the current resolution level of the sequence of resolution levels until the loss of Equation (4) is minimized, resulting in a trained scene generation model 115 at the current resolution level.

From block 320, the method 300 proceeds to block 330.

At block 330, the training subsystem 118 determines whether a final resolution has been reached. As previously discussed, block 320 (including each of subblocks 321-326) is iteratively performed at each of a sequence of increasing resolution levels, the loss function being minimized at each of sequence of resolution levels before progressing to training the scene generation model 115 at the next resolution level of the sequence.

If the final resolution has not been reached, the method 300 returns to block 320. For example, block 320 (including each of the subblocks 321-326) is performed for each of a sequence of resolution levels until the scene generation model 115 is trained for a highest resolution level. At each new iteration of subblocks 321-326, parameters of the scene generation model 115 are modified to minimize losses determined from the comparisons performed at subblocks 324 and 325. Further details about this iterative process for training the scene generation model 115 over a sequence of increasing resolution levels is described herein in FIG. 4.

Returning to block 330, if the final resolution has been reached, the method 300 proceeds to block 340.

At block 340, the method 300 involves storing the trained generator model 115. For example, the training subsystem 118 stores the trained scene generator model 115, which is trained at the highest resolution level of the sequence of resolution levels, in the data storage unit 111.

In certain embodiments, from block 350 the method 300 proceeds to block 210 of FIG. 2. For example, the scene generation subsystem 119 can apply the trained scene generation model 115 to a set of input 2D images 101 to generate one or more output 3D remix scenes 104.

FIG. 4 illustrates a process of training a scene generation model 115, according to certain embodiments described herein. One or more computing devices (e.g., the scene modeling system 110 or the individual subsystems 118 and 119 contained therein) implement operations depicted in FIG. 4. For illustrative purposes, FIG. 4 is described with reference to certain examples depicted in the figures. Other implementations, however, are possible.

As illustrated in FIG. 4, the approach for training the scene generation model 115 (e.g., as described in method 300 of FIG. 3), includes two parts: an initialization of a reference 3D feature grid (top row of FIG. 4) and a stage-wise training of the scene generation model (lower rows of FIG. 4). As illustrated in FIG. 4, during the initialization phase of training, the training subsystem 118 renders a reference 3D grid 103 using a renderer 401 based on set of input 2D images 101 and reference 2D renderings 405. Reference 2D renderings 405 are 2D images rendered by the training subsystem 118 from the reference 3D grid 103 and from which reference 2D patches 114 can be selected. In some instances, the training subsystem 118 determines a photoconsistency between the input 2D images 101 and the reference 2D renderings 405 In some instances, a photoconsistency is a difference between a rendered image of the 3D grid 103 and a ground truth image of the reference 2D renderings 405. In some instances, the photoconsistency is a similarity between a rendered image of the 3D grid 103 and a ground truth image of the reference 2D renderings 405.

As illustrated in FIG. 4, during stage-wise training, the training subsystem 115 trains the scene generation model 115 at each of a sequence of increasing resolution levels z, starting from the bottom row of FIG. 4 at a resolution level of 0 and moving upward through resolution level 1 up to resolution level N. The training subsystem 118 renders a respective reference 3D grid 103 at each of a sequence of n resolution levels which are shown as upsampled in FIG. 4 to each of the sequence of resolution levels 1, 2, . . . . N. At each resolution level, the training subsystem 118 generates a 3D feature grid 106, obtains a 3D patch 107 (e.g. 107-1, 107-2, . . . 107-N) from the 3D feature grid 106, obtains a reference 3D patch 113 (e.g. 113-1, 113-2, . . . 113-N) from the reference 3D grid 103, and determines a loss 417 (e.g. 417-1, 417-2, . . . 417-N) based on comparing the respective 3D patch 107 and reference 3D patch 113 using a discriminator 415. Also, at each resolution level 1, 2, . . . . N, the training subsystem 118 uses a renderer 401 to obtain a 2D patch 109 (e.g., 109-1, 109-2, . . . 109-N) from the 3D feature grid 106, uses the renderer 401 to obtain a reference 2D patch 114 (e.g., 114-1, 114-2, . . . 114-N), and determines a loss 418 (e.g. 418-1, 418-2, . . . 418-N) based on comparing the respective 2D patch 109 and reference 2D patch 114 using a discriminator 416.

FIG. 5 illustrates example 3D remix scenes generated using the scene generation model described herein, according to certain embodiments described herein. One or more computing devices (e.g., the scene modeling system 110 or the individual subsystems 118 and 119 contained therein) implement operations depicted in FIG. 5. For illustrative purposes, FIG. 5 is described with reference to certain examples depicted in the figures. Other implementations, however, are possible. As illustrated in FIG. 5, from a single real world scene 501 (e.g., a school of fish swimming), at least three input 2D images 101 are determined, for example, from three camera positions/orientations 101-1, 101-2, and 101-3. Using the set of input 2D images 101, the scene generation model 115 (the 3INGAN model 115 illustrated in FIG. 5) is trained to generate 3D scene remixes 104 at increasing resolution levels z (e.g., 3D scene remixes 104-1, 104-2, 104-3 at respective resolution levels z1, z2, . . . zN, respectively). The rendered 3D scene remixes 104-1, 104-2, 104-3 illustrated in FIG. 4 can be rendered from arbitrary camera configurations, without any flickering or spatio-temporal artifacts. As shown in the zoomed in regions 104-1Z, 104-2Z, 104-3Z of respective 3D scene remixes 104-1, 104-2, 104-3, each of the 3D scene remixes 104 includes content that is different from the content of the single real world scene 501. For example, the school of fish depicted in each of the 3D scene remixes 104-1, 104-2, 104-3 is shown in a different arrangement and/or quantity of fish from the arrangement and/or quantity of fish depicted in the single real world scene 501.

Examples of Computing Environments for Implementing Certain Embodiments

Figure 6:
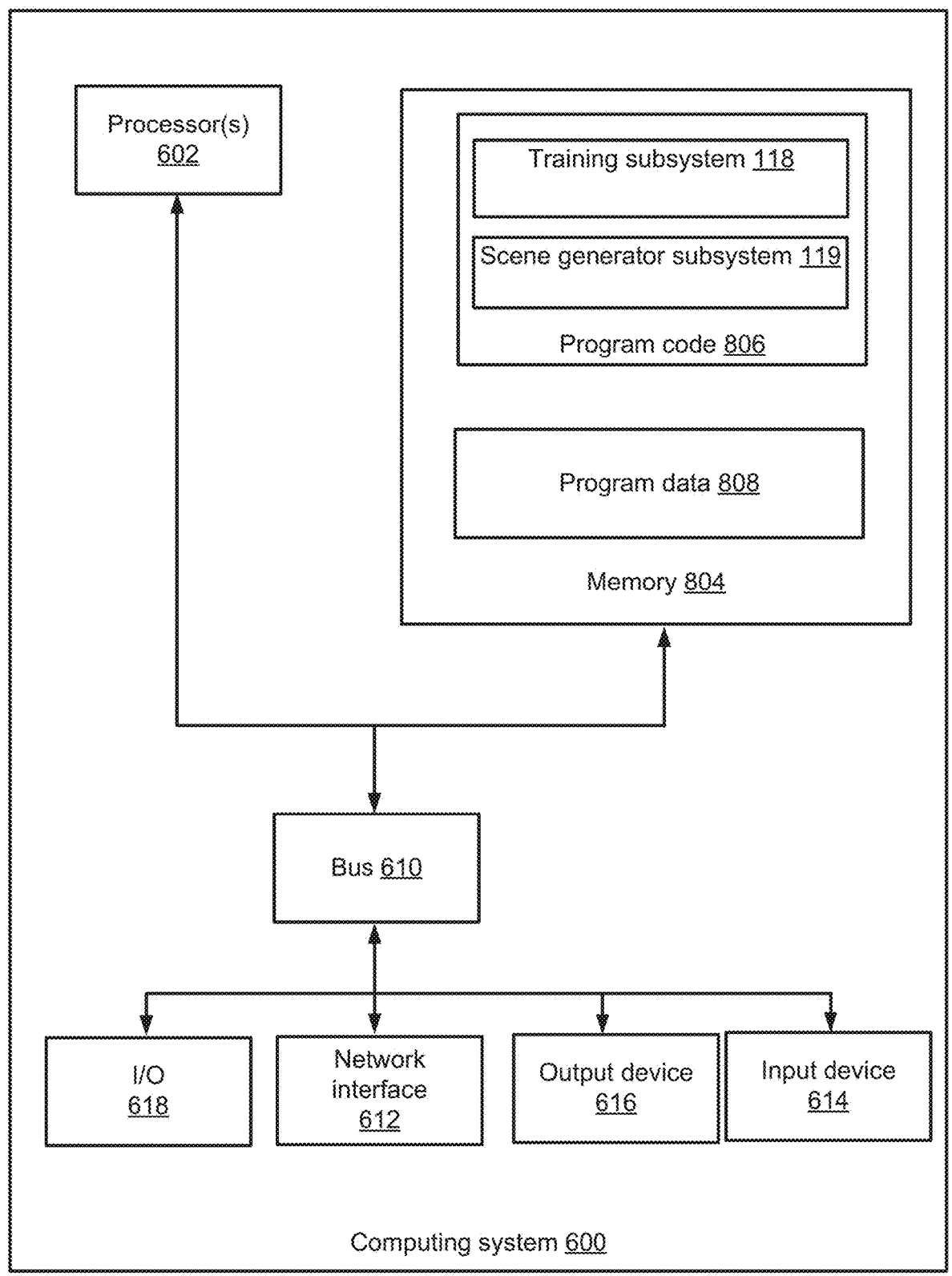
FIG. 6 depicts an example of a computing system that performs certain operations described herein, according to certain embodiments disclosed herein.

Any suitable computer system or group of computer systems can be used for performing the operations described herein. For example, FIG. 6 depicts an example of a computer system 800. The depicted example of the computer system 600 includes a processing device 602 communicatively coupled to one or more memory components 604. The processing device 602 executes computer-executable program code stored in a memory component 604, accesses information stored in the memory component 604, or both. Execution of the computer-executable program code causes the processing device to perform the operations described herein. Examples of the processing device 602 include a microprocessor, an application-specific integrated circuit ("ASIC"), a field-programmable gate array ("FPGA"), or any other suitable processing device. The processing device 602 can include any number of processing devices, including a single processing device.

The memory components 604 includes any suitable non-transitory computer-readable medium for storing program code 606, program data 608, or both. A computer-readable medium can include any electronic, optical, magnetic, or other storage device capable of providing a processing device with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the memory components 504 can be volatile memory, non-volatile memory, or a combination thereof.

The computer system 600 executes program code 606 that configures the processing device 602 to perform one or more of the operations described herein. Examples of the program code 606 include, in various embodiments, the scene modeling system 110 (including the training subsystem 118 and the scene generation subsystem 119) of FIG. 1, which may include any other suitable systems or subsystems that perform one or more operations described herein (e.g., one or more neural networks, encoders, attention propagation subsystem and segmentation subsystem). The program code 606 may be resident in the memory components 604 or any suitable computer-readable medium and may be executed by the processing device 602 or any other suitable processor.

The processing device 602 is an integrated circuit device that can execute the program code 606. The program code 606 can be for executing an operating system, an application system or subsystem, or both. When executed by the processing device 602, the instructions cause the processing device 602 to perform operations of the program code 606. When being executed by the processing device 602, the instructions are stored in a system memory, possibly along with data being operated on by the instructions. The system memory can be a volatile memory storage type, such as a Random Access Memory (RAM) type. The system memory is sometimes referred to as Dynamic RAM (DRAM) though need not be implemented using a DRAM-based technology. Additionally, the system memory can be implemented using non-volatile memory types, such as flash memory.

In some embodiments, one or more memory components 604 store the program data 808 that includes one or more datasets described herein. In some embodiments, one or more of data sets are stored in the same memory component (e.g., one of the memory components 604). In additional or alternative embodiments, one or more of the programs, data sets, models, and functions described herein are stored in different memory components 604 accessible via a data network. One or more buses 610 are also included in the computer system 600. The buses 610 communicatively couple one or more components of a respective one of the computer system 600.

In some embodiments, the computer system 600 also includes a network interface device 612. The network interface device 612 includes any device or group of devices suitable for establishing a wired or wireless data connection to one or more data networks. Non-limiting examples of the network interface device 612 include an Ethernet network adapter, a modem, and/or the like. The computer system 600 is able to communicate with one or more other computing devices via a data network using the network interface device 612.

The computer system 600 may also include a number of external or internal devices, an input device 614, a presentation device 616, or other input or output devices. For example, the computer system 600 is shown with one or more input/output ("I/O") interfaces 618. An I/O interface 618 can receive input from input devices or provide output to output devices. An input device 614 can include any device or group of devices suitable for receiving visual, auditory, or other suitable input that controls or affects the operations of the processing device 602. Non-limiting examples of the input device 614 include a touchscreen, a mouse, a keyboard, a microphone, a separate mobile computing device, etc. A presentation device 616 can include any device or group of devices suitable for providing visual, auditory, or other suitable sensory output. Non-limiting examples of the presentation device 616 include a touchscreen, a monitor, a speaker, a separate mobile computing device, etc.

Although FIG. 6 depicts the input device 614 and the presentation device 616 as being local to the computer system 600, other implementations are possible. For instance, in some embodiments, one or more of the input device 614 and the presentation device 616 can include a remote client-computing device that communicates with computing system 600 via the network interface device 612 using one or more data networks described herein.

Embodiments may comprise a computer program that embodies the functions described and illustrated herein, wherein the computer program is implemented in a computer system that comprises instructions stored in a machine-readable medium and a processing device that executes the instructions to perform applicable operations. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computer systems. Moreover, any reference to an act being performed by a computer should not be construed as being performed by a single computer as more than one computer may perform the act.

The example embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

Figure 7:
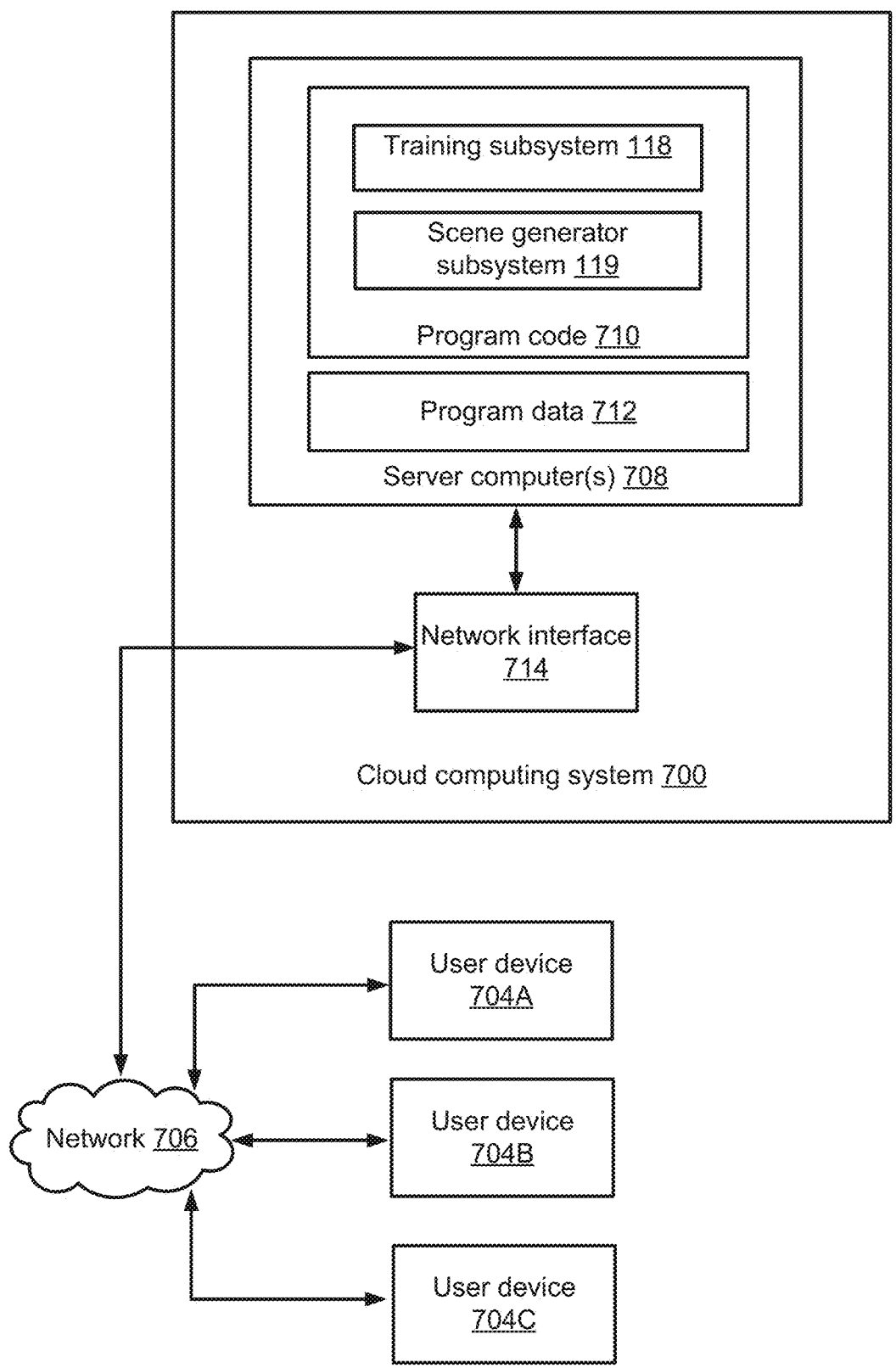
FIG. 7 depicts an example of a cloud computing system that performs certain operations described herein, according to certain embodiments disclosed herein.

In some embodiments, the functionality provided by computer system 600 may be offered as cloud services by a cloud service provider. For example, FIG. 7 depicts an example of a cloud computer system 700 offering a service for generating 3D remix scenes 104 based on a set of input 2D images 101 of an environment, which can be used by a number of user subscribers using user devices 704A, 704B, and 704C across a data network 706. The cloud computer system 700 performs the processing to provide the service of generating 3D remix scenes 104 based on a set of input 2D images 101 of an environment. The cloud computer system 700 may include one or more remote server computers 708.

The remote server computers 708 include any suitable non-transitory computer-readable medium for storing program code 710 (e.g., the training subsystem 118 and the scene generation subsystem 119 of FIG. 1) and program data 712, or both, which is used by the cloud computer system 700 for providing the cloud services. A computer-readable medium can include any electronic, optical, magnetic, or other storage device capable of providing a processing device with executable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript. In various examples, the server computers 908 can include volatile memory, non-volatile memory, or a combination thereof.

One or more of the server computers 708 execute the program code 710 that configures one or more processing devices of the server computers 708 to perform one or more of the operations that generate 3D remix scenes 104 based on a set of input 2D images 101 of an environment. As depicted in the embodiment in FIG. 7, the one or more servers providing the service for generating 3D remix scenes 104 based on a set of input 2D images 101 of an environment may implement the training subsystem 118 and the scene generation subsystem 119. Any other suitable systems or subsystems that perform one or more operations described herein (e.g., one or more development systems for configuring an interactive user interface) can also be implemented by the cloud computer system 700.

In certain embodiments, the cloud computer system 700 may implement the services by executing program code and/or using program data 712, which may be resident in a memory component of the server computers 708 or any suitable computer-readable medium and may be executed by the processing devices of the server computers 708 or any other suitable processing device.

In some embodiments, the program data 712 includes one or more datasets and models described herein. In some embodiments, one or more of data sets, models, and functions are stored in the same memory component. In additional or alternative embodiments, one or more of the programs, data sets, models, and functions described herein are stored in different memory components accessible via the data network 706.

The cloud computer system 700 also includes a network interface device 714 that enable communications to and from cloud computer system 700. In certain embodiments, the network interface device 714 includes any device or group of devices suitable for establishing a wired or wireless data connection to the data networks 706. Non-limiting examples of the network interface device 714 include an Ethernet network adapter, a modem, and/or the like. The service for generating 3D remix scenes 104 based on a set of input 2D images 101 of an environment is able to communicate with the user devices 704A, 704B, and 704C via the data network 706 using the network interface device 714.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included within the scope of claimed embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computer system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as an open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Additionally, the use of "based on" is meant to be open and inclusive, in that, a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A system comprising:
   a memory component; and
   a processing device coupled to the memory component, the processing device to perform operations comprising:
   applying a scene generation model to a set of input 2D images of first content to generate a 3D remix scene, wherein the 3D remix scene includes second content that is different from the first content, wherein applying the scene generation model includes, for each resolution of a sequence of progressively increasing resolutions:
   generating a first 3D reference grid at a current resolution and a reference 2D image rendered from the first 3D reference grid;
   generating a first 3D feature grid at the current resolution and a 2D image rendered from the first 3D feature grid;
   configuring the scene generation model based on:
   performing a first comparison, using a 2D discriminator, of an input 2D image of the set of input 2D images and the 2D reference image;
   performing a second comparison, using a 3D discriminator, of the first 3D feature grid and the first 3D reference grid; and
   based at least on the first comparison and the second comparison, configuring one or more parameters of the scene generation model, wherein the 3D remix scene is generated using the configured scene generation model; and
   transmitting, for display via a user interface, the 3D remix scene.

2. The system of claim 1, wherein the set of input 2D images are captured from a plurality of camera orientations of a 3D environment, wherein the 3D environment includes first content.

3. The system of claim 1, the operations further comprising:
   generating a second 3D reference grid at a second resolution and a second reference 2D image rendered from the second 3D reference grid, wherein the second resolution is a finer resolution than the current resolution;
   third comparing, to the second 3D reference grid using the 3D discriminator, a second 3D feature grid at the second resolution generated by applying the scene generation model configured with the one or more parameters to the set of input 2D images; and
   based on the third comparing, reconfiguring the configured one or more parameters of the scene generation model, wherein the 3D remix scene is generated by the scene generation model having the reconfigured one or more parameters.

4. The system of claim 3, wherein third comparing further comprises:
   selecting, from the second 3D reference grid, a second 3D reference patch;
   selecting, from the 3D remix scene, a second 3D patch; and
   wherein the configured one or more parameters are reconfigured based on a comparison, using the 3D discriminator, of the second 3D patch with the second 3D reference patch.

5. The system of claim 3, the operations further comprising:
   rendering, from the 3D remix scene, a second 2D image;
   selecting, from the second 2D image, a second 2D patch;
   rendering, from the second 3D reference grid, a second 2D reference image;
   selecting from the second 2D reference image, a second reference 2D patch; and
   reconfiguring the configured one or more parameters associated with the scene generation model based on a comparison, using the 2D discriminator, of the second 2D patch with the second reference 2D patch.

6. The system of claim 1, wherein the second content includes a second quantity of an object that is different from a first quantity of the object in the first content.

7. The system of claim 1, wherein the second content includes an object in a second position that is different from a first position of the object in the first content.

8. The system of claim 1, the operations further comprising:
   capturing one or more 2D output images at one or more camera orientations within the 3D remix scene; and
   transmitting, for display via the user interface, the one or more 2D output images.

9. A non-transitory computer-readable medium storing executable instructions, which when executed by a processing device, cause the processing device to perform operations comprising:
   applying a scene generation model to a set of input 2D images of first content to generate a 3D remix scene, wherein the 3D remix scene includes second content that is different from the first content, wherein applying the scene generation model includes, for each resolution of a sequence of progressively increasing resolutions:
   generating a 3D reference grid at a current resolution and a reference 2D image rendered from the 3D reference grid;
   generating a 3D feature grid at the current resolution and a 2D image rendered from the 3D feature grid;
   configuring the scene generation model based on:
   comparing, using at least a 2D discriminator and a 3D discriminator, the reference 3D grid and the 3D feature grid at the current resolution; and
   based at least on the comparing, configuring one or more parameters of the scene generation model, wherein the 3D remix scene is generated using the configured scene generation model; and
   transmitting, for display via a user interface, the 3D remix scene.

10. The non-transitory computer-readable medium of claim 9, wherein the comparing comprises:
    rendering a reference 2D image from the 3D reference grid;
    performing a first comparison, using the 2D discriminator, an input 2D image of the set of input 2D images, and the 2D reference image; and
    performing a second comparison, using the 3D discriminator, of the 3D feature grid at the current resolution generated by applying the scene generation model to the set of input 2D images, to the 3D reference grid.

11. The non-transitory computer-readable medium of claim 9, wherein the second content includes a second quantity of an object that is different from a first quantity of the object in the first content.

12. The non-transitory computer-readable medium of claim 9, further comprising:
generating a second 3D reference grid at a second resolution and a second reference 2D image rendered from the second 3D reference grid, wherein the second resolution is a finer resolution than the current resolution;
third comparing, to the second 3D reference grid using the 3D discriminator, a second 3D feature grid at the second resolution generated by applying the scene generation model configured with the one or more parameters to the set of input 2D images; and
based on the third comparing, reconfiguring the configured one or more parameters of the scene generation model, wherein the 3D remix scene is generated by the scene generation model having the reconfigured one or more parameters.

13. A method performed by one or more computing devices associated with a scene modeling system, comprising:
applying a scene generation model to a set of input 2D images of first content to generate a 3D remix scene, wherein the 3D remix scene includes second content that is different from the first content, wherein applying the scene generation model includes, for each resolution of a sequence of progressively increasing resolutions:
generating a first 3D reference grid at a current resolution and a reference 2D image rendered from the first 3D reference grid;
generating a first 3D feature grid at the current resolution and a 2D image rendered from the first 3D feature grid;
configuring the scene generation model based on:
performing a first comparison, using a 2D discriminator, of the 2D image and the 2D reference image;
performing a second comparison, using a 3D discriminator, of the first 3D feature grid and the first 3D reference grid; and
based at least on the first comparison and the second comparison, configuring one or more parameters of the scene generation model, wherein the 3D remix scene is generated using the configured scene generation model; and
transmitting, for display via a user interface, the 3D remix scene.

14. The method of claim 13, wherein the set of input 2D images are captured from a plurality of camera orientations in a 3D environment, and wherein the 3D environment includes first content.

15. The method of claim 13, further comprising:
generating a second 3D reference grid at a second resolution and a second reference 2D image rendered from the second 3D reference grid, wherein the second resolution is a finer resolution than the current resolution;
third comparing, to the second 3D reference grid using the 3D discriminator, a second 3D feature grid at the second resolution generated by applying the scene generation model configured with the one or more parameters to the set of input 2D images; and
based on the third comparing, reconfiguring the configured one or more parameters of the scene generation model, wherein the 3D remix scene is generated by the scene generation model having the reconfigured one or more parameters.

16. The method of claim 15, wherein third comparing further comprises:
selecting, from the second 3D reference grid, a second 3D reference patch;
selecting, from the 3D remix scene, a second 3D patch; and
wherein the configured one or more parameters are reconfigured based on a comparison, using the 3D discriminator, of the second 3D patch with the second 3D reference patch.

17. The method of claim 15, further comprising:
rendering, from the 3D remix scene, a second 2D image;
selecting, from the second 2D image, a second 2D patch;
rendering, from the second 3D reference grid, a second 2D reference image;
selecting from the second 2D reference image, a second reference 2D patch; and
reconfiguring the configured one or more parameters associated with the scene generation model based on a comparison, using the 2D discriminator, of the second 2D patch with the second reference 2D patch.

18. The method of claim 13, wherein the second content includes a second quantity of an object that is different from a first quantity of the object in the first content.

19. The method of claim 13, wherein the second content includes an object in a second position that is different from a first position of the object in the first content.

20. The method of claim 13, further comprising:
capturing one or more 2D output images at one or more camera orientations within the 3D remix scene; and
transmitting, for display via the user interface, the one or more 2D output images.

* * * * *